March 13, 1962 G. G. ROLLER ETAL 3,024,795
TRUCK WASHING APPARATUS
Filed Feb. 11, 1960 2 Sheets-Sheet 1
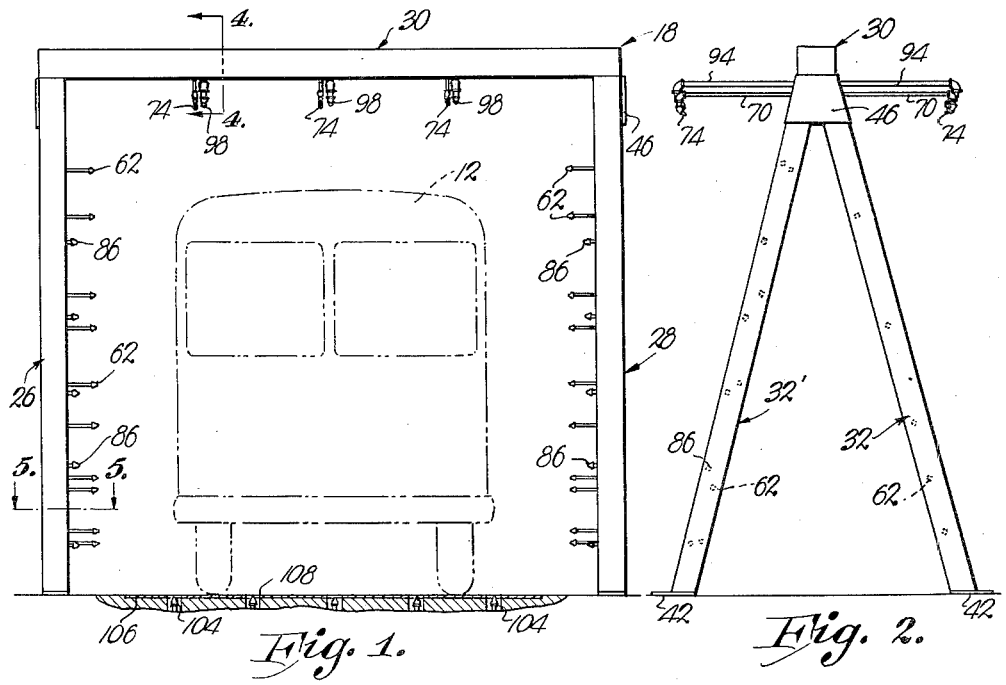
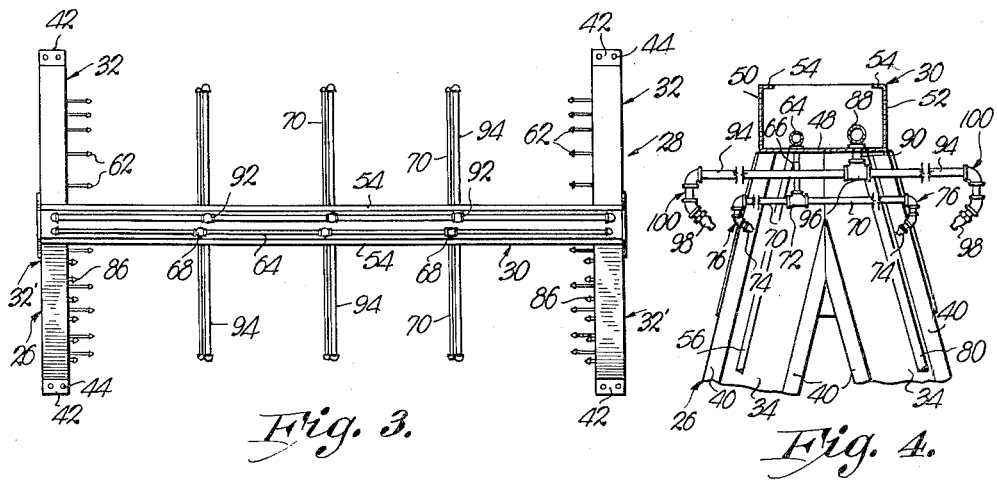
INVENTORS.
Gaylord G. Roller
Gelder V. Lewis
BY
Hovey, Schmidt, Johnson & Hovey
ATTORNEYS.

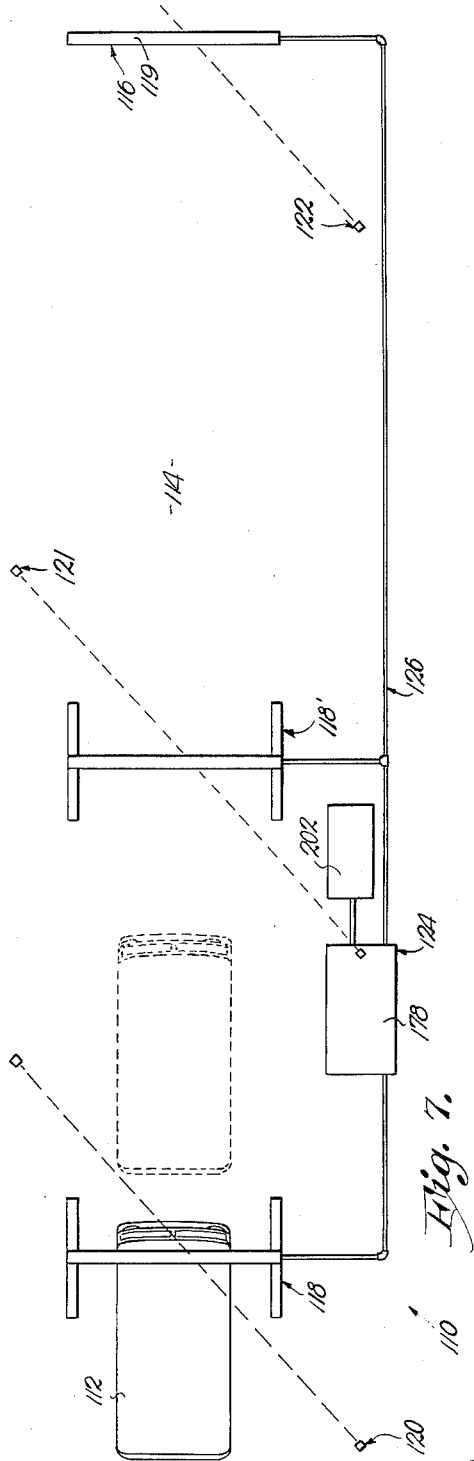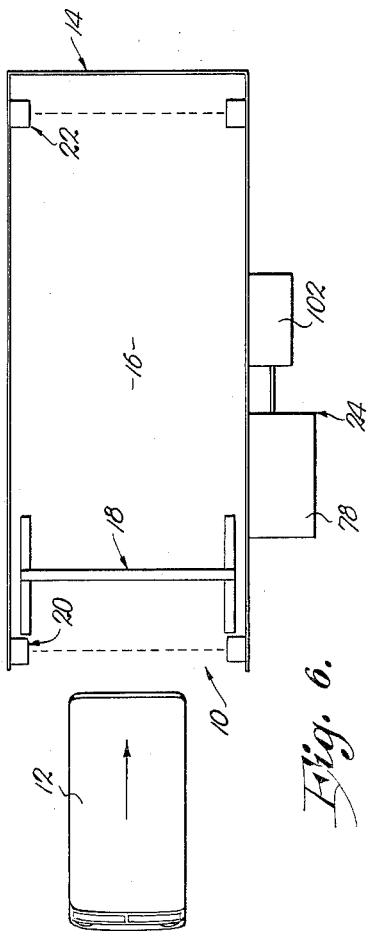

United States Patent Office 3,024,795
Patented Mar. 13, 1962

3,024,795
TRUCK WASHING APPARATUS
Gaylord G. Roller, Overland Park, and Gelder V. Lewis, Mission, Kans., assignors, by direct and mesne assignments, to American Truck Washing and Detergent Co., a corporation of Missouri
Filed Feb. 11, 1960, Ser. No. 8,135
6 Claims. (Cl. 134—99)

This invention relates to equipment for washing vehicles or the like and particularly to automatic apparatus capable of thoroughly cleaning the exterior surfaces of vehicles without manual scrubbing being required in order to effect complete removal of dirt, grime, greasy substances and other materials from the vehicle.

It is the primary object of the instant invention to provide automatic vehicle washing equipment which is specifically designed to permit rapid washing of the exterior surfaces of a truck or the like by the simple expedient of slowly moving the vehicle to be washed through the cleaning equipment.

It is a further important object to provide truck and other vehicle washing apparatus as described which performs the cleaning operation through the simple medium of initially directing a cleansing fluid including a detergent, against the outer surface of the vehicle in a manner to remove all foreign materials therefrom, followed by delivery of rinse water to the exterior surfaces in order to wash away the detergent composition as well as any remaining foreign materials on the vehicle surface.

It is a still further important object of the invention to provide truck and other vehicle washing equipment wherein the detergent composition is directed against the surface of the vehicle at a relatively high pressure to effect displacement of foreign substances and materials thereon without manual scrubbing being required and with complete cleaning of the vehicle resulting, regardless of the irregular configuration of the outer surfaces thereof. In this connection, an important object is to provide vehicle washing apparatus as referred to herein, wherein the apparatus includes rinsing means for delivering rinse water to the outer surfaces of the vehicle after subjection of the same to the detergent composition and with the rinse water being at a substantially lower pressure than that at which the detergent cleansing agent is forced against the surface of the vehicle, whereby the detergent is completely removed from the vehicle along with any remaining foreign materials and thus, precluding the necessity of wiping or otherwise drying the exterior of the vehicle after the cleaning operation, which would materially add to the cost of washing each vehicle.

Another important aim of the invention is to provide vehicle washing equipment wherein a special detergent composition is employed in the cleansing water which is designed to thoroughly remove all foreign substances from the outer surfaces of the vehicle, particularly when the detergent composition is directed against the exterior of the truck or the like at the high pressure referred to above.

An important object of the invention is to provide automatic vehicle washing equipment wherein the truck or similar vehicle can be thoroughly cleaned by the rapid and simple operation of driving the same through apparatus for directing a detergent composition against the outer surfaces of the vehicle at high pressure, and thence moving the vehicle through a rinse area. In this respect, a further object is to provide improved vehicle washing equipment wherein the detergent composition delivery station and rinse station are combined so that the truck may initially be moved through the equipment in one direction and then driven through in the opposite direction, with the washing and rinsing operations being effected sequentially. It therefore follows, that a still further object is to provide automatic equipment as described wherein the detergent delivery means and the rinse structure are disposed in spaced relationship so that the truck may be driven through the same in one direction to effect the washing operation.

A further important aim of the invention is to provide a novel method of washing trucks utilizing a special detergent composition delivered to the vehicle under high pressure in order to thoroughly remove all foreign materials without mechanical or manual scrubbing being required.

Other important objects and details of the present equipment as well as the novel method will be described or become obvious as the following specification progresses.

In the drawings:

FIGURE 1 is a front elevational view of one part of the washing equipment embodying the concepts of the present invention and particularly showing frame structure for carrying the detergent delivery and spray rinse means, a portion of the floor being broken away and in section to reveal the disposition of spray units recessed therein;

FIG. 2 is a side elevational view of the frame structure shown in FIG. 2 and also illustrating the disposition of the spray and rinse components of the apparatus;

FIG. 3 is a plan view of the frame shown in FIGS. 1 and 2;

FIG. 4 is an enlarged, fragmentary, vertical cross-sectional view taken substantially on the line 4—4 of FIG. 1 and looking in the direction of the arrows;

FIG. 5 is an enlarged, fragmentary, horizontal cross-sectional view taken substantially on the line 5—5 of FIG. 1 and looking downwardly;

FIG. 6 is a schematic representation of one form of the instant apparatus and showing the various components permitting washing and rinsing of a vehicle by backing the same into a stall, followed by driving of the same forwardly; and FIG. 7 is another schematic representation of a second type of automatic washing equipment embodying the present invention and utilizing the principle wherein a vehicle is driven through the equipment in one direction from the entrance to the exit thereof, in order to effect washing of the vehicle.

Referring initially to FIG. 6 and which shows the preferred form of the present invention, automatic washing equipment broadly numerated 10 is particularly adapted for cleaning a vehicle such as truck 12 without manual or mechanical scrubbing of the exterior surfaces thereof being required and by the simple expedient of backing the truck into stall 14, followed by driving truck 12 forwardly to the initial position thereof shown in the designated figure. Equipment 10 is preferably housed within an enclosure (not shown) having a flat floor 16 presenting a runway and including a drain (not shown) for permitting the detergent composition and rinse water to flow to a sewer outlet.

The principal components of equipment 10 provided at stall 14 comprise a frame unit 18, electric eye means 20 and 22, detergent composition and rinse water supply means 24, and means for conducting the detergent composition and the rinse water to frame unit 18.

Frame unit 18 is illustrated in detail in FIGS. 1 to 5 inclusive, wherein it can be seen that the same includes a pair of opposed, upright, primary, inverted V-shaped frames 26 and 28 and interconnected by an overhead element 30.

Each of the frames 26 and 28 includes a channel-shaped member 32 shown in detail in FIG. 5 and including an outwardly facing, main longitudinally extending plate 34 and parallel, laterally extending side plates 36 and 38 integral with opposed, longitudinal margins of plate 34. Inwardly projecting, longitudinally extending segments 40 joined to the outer extremities of side plates 36 and 38 respectively, project toward each other and are in spaced relaionship to clear rinse and detergent spray means, as will be described hereinafter.

Base plates 42 secured to the lowermost extremity of each of the members 32 facilitate connection of frame unit 18 to the upper surface of floor 16 through suitable bolts 44 or the like.

As indicated in FIG. 2, members 32 of each of the frames 26 and 28 converge as the uppermost ends thereof are approached, with trapezoidal-shaped gusset plate 46 welded to the upper extremities of plates 34 serving to interconnect members 32, with the latter defining an inverted V-shaped frame.

Element 30 extending across the upper end of frame unit 18 includes a horizontal, transversely extending, elongated main plate 48, a pair of opposed, upright, parallel side plates 50 and 52, and relatively narrow, inwardly projecting, longitudinally extending sections 54 integral with respective longitudinal margins of side plates 50 and 52 remote from plate 48.

A detergent supply conduit 56 is carried by and extends upwardly within each of the members 32. Flexible tubes 58 connected to each of the sonduits 56 and communicating therewith through fittings 60, extend outwardly between opposed margins of corresponding segments 40 and are thereby directed toward a truck or the like 12 as the same passes through frame unit 18. Slot fan nozzles 62, mounted on the outermost ends of tubes 58, produce a fan spray of an arc of approximately 55° and preferably in a substantially vertical plane. Springs 63, surrounding each of the tubes 58 and abutting against corresponding nozzles 62 and fittings 60, maintain tubes 58 in a substantially horizontal position to assure direction of the detergent composition against the outer surface of truck 12. Another detergent conduit 64 carried within element 30 on the upper surface of plate 48 is in communication with at least one of the conduits 56 and extends the full length of element 30 as shown in FIG. 3. Thus in the preferred construction, it is contemplated that conduit 64 be in communication with conduits 56 extending upwardly in both of the frames 26 and 28. Three conduits 66 are connected to conduit 64 in substantially equally spaced relationship along the longitudinal length thereof as shown in FIG. 3, with conduits 66 extending downwardly through suitable openings therefor in plate 48 and coupled in conduit 64 by corresponding T's 68. Tubular sections 70 extending outwardly from corresponding conduits 66 in a direction parallel to the path of travel of truck 12 and communicating with corresponding conduits 66 through T's 72, mount fan nozzles 74 on the outermost end thereof through fittings 76 which cause the axes of nozzles 74 to be disposed at substantially a 45° angle with respect to the longitudinal length of sections 70 and facing downwardly and inwardly toward the area beneath element 30 of frame unit 18.

Conduits are also provided for coupling the lowermost extremities of conduits 56 to detergent composition reservoir 78 forming a part of supply means 24. At this juncture, it should be pointed out that pump means is associated with reservoir 78 for forcing detergent composition therefrom to conduits 56 and 64 at a relatively high pressure and preferably 500 p.s.i. Thus, it is contemplated that reservoir 78 be of the type permitting a preselected amount of water to be directed thereinto, followed by introduction of a suitable amount of detergent into the same, whereby the reservoir may be sealed and pressure applied by operation of the pump set forth above. Although various systems may be employed to provide the pressure required to effect efficient washing of truck 12, the apparatus described has been found to be the simplest and most troublefree under the moist conditions encountered in washing vehicles or the like.

When frame unit 18 is employed in washing equipment 10 utilizing the stall principle, members 32' of frames 26 and 28 and normally disposed in closest proximity to the entrance to stall 14, are provided with rinse water pipes 80 therein which are disposed in parallelism with corresponding proximal conduits 56. A number of relatively short tubes or pipes 82 communicate with respective pipes 80 through fittings 84, with pipes 82 extending outwardly between segments 40 and mounting cone nozzles 86 adapted to direct conical rinse sprays against the outer surface of vehicle 12.

Element 30 also carries a rinse pipe 88 therewithin, extending across the length of plate 48 and communicating with the upper ends of corresponding pipes 80. Three pipes 90 extend downwardly through openings therefor in plate 48 in close proximity to respective conduits 66, with pipes 90 being in communication with pipe 88 through suitable T's 92. Pipe sections 94 extending outwardly from corresponding pipes 90 in opposite directions and in parallelism with sections 70, are coupled to and communicate with pipes 90 through T's 96. Cone nozzles 98 are mounted on the outer ends of respective pipe sections 94 through fittings 100 which also cause the axes of nozzles 98 to be disposed at substantially a 45° angle relative to pipe sections 94 and directed downwardly and inwardly toward the area under frame unit 18.

Pipes are also provided for connecting pipes 80 to a supply of rinse water which may include a separate chamber in reservoir 78 or directly coupled to the city water supply. It may be noted that the pump unit 102 forming a part of supply means 24 may be provided with means for maintaining the pressure of the rinse water at a predetermined level in conjunction with maintenance of the detergent composition at the pressure specified above. For rinsing purposes, it has been found that the water should be at a pressure of approximately 100 p.s.i. and if the city water source is lower than this figure, then pump means should be provided in unit 102 for maintaining the rinse water supply at the stipulated value.

Stall 14 is also provided with a series of cone nozzles 104 recessed in floor 16 below element 30 and coupled to a rinse water supply line. A metal plate 106 extending transversely of floor 16 between frames 26 and 28 has a series of openings 108 therein for clearing respective nozzles 104, it being noted that the latter are positioned so that the conical sprays are directed upwardly against the undercarriage of truck 12.

In order to control operation of the detergent and rinse sprays, the electric eye means 20 and 22 comprise opposed photoelectric cells in circuit with electrical mechanism for turning the pump units off and on and actuating valves to permit either the detergent composition or the rinse water to pass to frame unit 18 as will be described hereinafter.

In order to effectively wash truck 12 without mechanical or hand scrubbing thereof being required, it has been found that the extremely high pressure of 500 p.s.i. maintained on the detergent composition is necessary in order to obtain the desired results, and furthermore, that a special cleaning composition should be used in the wash water. The preferred detergent material comprises approximately by weight, 17% Ninol 1281, 10% trisodium phosphate (fine crystal), and 73% sodium tripolyphosphate. The Ninol 1281 is a nonionic detergent of the amide type produced by condensation of fatty acids and ethanolamines to form an alkylolamide. This product is manufactured and sold by Ninol Labs, Inc., 1719 So. Clinton Street, Chicago 16, Illinois.

In initial mixing of the detergent composition, the phosphates are placed in a ribbon mixer and then the Ninol 1281 is added slowly. Addition of the Ninol 1281 should be at a rate to prevent temporary gumming of the batch. A suitable alkali fast dye may be also incorporated into the composition and preferably added during the mixing procedure.

A suitable quantity of the detergent composition, and preferably 28 oz. of the dry material for each 100 gal. of water at room temperature, is introduced into a supply of water in reservoir 78 to thereby place equipment 10 in condition for washing of a vehicle.

In operation of equipment 10, truck 12 is backed up to the opening of stall 14 and then slowly driven rearwardly beneath frame unit 18. As soon as truck 12 breaks the beam of light between the photoelectric cells of electric eye means 20, a pump is actuated in unit 102 and valves are opened to cause the detergent composition as described above to be directed into conduits 56 and 64 at a pressure of at least 500 p.s.i. The detergent is sprayed outwardly against the surfaces of truck 12 in fan-shaped sprays as the vehicle is slowly backed through frame unit 18.

As soon as truck 12 breaks the beam of light between the photoelectric cells of electric eye means 22, valves are closed, discontinuing spray of detergent composition outwardly through nozzles 62 and 74 and thereby warning the driver of truck 12 that he has moved the vehicle far enough in one direction of movement thereof. Next, the driver slowly drives the truck 12 forwardly and as soon as the beam of light is again permitted to pass between the photoelectric cells of electric eye means 22, valves are opened to permit rinse water to be directed into pipes 80 and 88 as well as to the pipe communicating with nozzles 104. During forward movement of truck 12, the rinse water is directed in coneshaped sprays against the sides and top of the vehicle as well as against the undercarriage thereof from nozzles 104.

Particular note is directed to the disposition of nozzles 74 and 98 which cause the detergent composition as well as the spray rinse to be directed downwardly and inwardly to thereby effectively clean the front and rear panels of truck 12.

The above described operation may be carried out in approximately one to one and one-half minutes, with the truck being thoroughly cleaned and without hand or mechanical scrubbing of the outer surface thereof being required in any manner whatsoever.

For larger trucks, if desired, a hand operated spray nozzle may be employed and connected to reservoir 78 to thereby permit detergent composition and, alternately, rinse water to be directed by a man handling the nozzle unit, against the outer surface of the truck. The automatic stall 14 is obviously to be preferred, however, because of the speed of cleaning and the fact that the driver of the truck may merely remain in the same while effecting cleaning thereof.

In the alternate automatic washing equipment broadly designated 110 and shown in FIG. 7, the components thereof are designed so that the truck 112 may be washed while driven along an elongated path 114 in one direction.

The basic components of equipment 110 comprise a pair of spaced frame units 118 and 118′ which are identical with frame unit 18 with the exception of the rinse spray structures, which are omitted from frame units 118 and 118′ and are mounted on U-shaped frame 116. Undercarriage rinsing means similar to that provided by nozzles 104 and the pipes communicating therewith, is also positioned underneath the main transverse overhead element 119 of U-frame 116.

Detergent and rinse spray supply means 124 comprises a reservoir 178 and a pump unit 202 associated therewith. Suitable pipes and conduits broadly designated 126 are provided, coupling reservoir 178 to the nozzles of frames 118 and 118′ as well as rinse frame 116. Electric eye means broadly numerated 120, 121 and 122 are associated with frames 118, 118′ and 116 respectively for controlling direction of detergent liquid or rinse water against the outer surface of vehicle 112 in predetermined sequence. Note that electric eye means 120, 121 and 122 each include photoelectric cells disposed on opposed sides of the path of travel 114 of vehicle 112 and preferably arranged in angular relationship on opposite sides of respective frames, as shown in FIG. 7.

During operation of equipment 10, truck 112 is driven forwardly until the same breaks the beam of light between the photoelectric cells of electric eye means 120, whereby the pump unit 202 is actuated and valves are opened to cause detergent spray to be forced against the outer surface of the truck at the specified pressure of 500 p.s.i. Spray of detergent onto truck 112 is continued until the beam of light is again permitted to pass between the photoelectric cells of electric eye means 120, whereby the valves are closed and spray of detergent material from frame 118 is discontinued.

On continued forward movement of truck 112, the beam of light between the photoelectric cells of electric eye means 121 is next broken, thereby causing valves to be opened and effecting spraying of detergent composition from frame 118′ against the vehicle. This spray continues until the beam of light is again permitted to pass between the electric eyes of means 121, thereby shutting the valves and discontinuing the flow of detergent material.

When truck 112 is in the vicinity of U-frame 116, the beam of light between the photoelectric cells of electric eye means 122 is broken, whereby rinse water from reservoir 178 is directed onto the truck from suitable nozzles similar to nozzles 86. Upon clearance of the line between the photoelectric cells of electric eye means 122, the spray rinse is discontinued and the truck is in a thoroughly clean condition. Through utilization of automatic equipment 110, it can be recognized that trucks may be continuously driven through the apparatus along path 114 without regard for the spacing of such vehicles, because the electric eyes control operation of the detergent sprays as well as the rinse water and effective washing is provided so long as the trucks are driven at a speed commensurate with the effectiveness of the washing equipment. Tests have shown that this time should not be less than approximately one to one and one-half minutes for the entire cleaning process.

Although the preferred apparatus and method have been described and shown in detail, it is to be understood that certain parts of the equipment as well as steps in the method may be changed without departing from the spirit of the invention and it is therefore intended to be limited only by the scope of the appended claims.

Having thus described the invention what is claimed as new and desired to be secured by Letters Patent is:

1. A vehicle washing apparatus comprising an upright frame mounted on a surface at each side of a preselected path of travel of the vehicle, each of said frames being provided with a pair of elongated, angularly disposed members joined at the uppermost ends thereof and mutually converging as said ends are approached; an elongated, generally horizontal overhead element attached to said frames at the upper ends of said members and spanning the distance therebetween at an elevation to clear the top of said vehicle as the latter moves along said path; a plurality of first fluid discharge tubes mounted on each of the members in vertically spaced relationship, extending inwardly toward the path of travel of the vehicle and aligned with the longitudinal length of respective members; a number of downwardly directed second fluid discharge tubes carried by said element; conduit means on said members and the element and communicating with respective discharge tubes thereon; a source of cleansing fluid comprising a liquid having a detergent therein; and means operatively associated with said source for forcing the cleansing fluid outwardly through said first discharge tubes in inverted V-shaped sprays on opposite sides of the vehicle and downwardly directed sprays from said second discharge tubes as the vehicle is advanced along said path of travel and with the cleansing fluid being ejected at a pressure sufficient to dislodge particles of dirt from the surface of the vehicle without scrubbing thereof being required.

2. Vehicle washing apparatus as set forth in claim 1, wherein is provided a plurality of liquid discharge nozzle units on at least one member of each frame and on said element, said nozzle units on the members being disposed in vertically spaced relationship, aligned with the longitudinal length of a corresponding member and extending inwardly toward the path of travel of the vehicle and the nozzle units on said element being directed downwardly toward said surface, pipe means carried by the members having nozzle units thereon and by said element and communicating with respective nozzle units, a source of rinse liquid coupled to said pipe means, and means for controlling flow of said cleansing fluid and said rinse liquid to said conduit means and the pipe means respectively, to cause the cleansing fluid to be directed against the vehicle as the latter is moved along said path of travel in one direction and to cause the rinse liquid to be directed onto the vehicle as the latter is moved along said path in the opposite direction of movement thereof.

3. Vehicle washing apparatus as set forth in claim 2, wherein said conduit means and said pipe means on the element include elongated, tubular segments extending outwardly from said element and mounting respective second discharge tubes and said nozzle units remote from said elements.

4. Vehicle washing apparatus as set forth in claim 3, wherein said segments extend in both directions from said element and in substantially perpendicular relationship to the latter.

5. Vehicle washing apparatus as set forth in claim 3, wherein is provided tubular fittings on the outer extremities of said segments and mounting said second discharge tubes and the nozzle units in positions causing the latter to be directed downwardly and inwardly toward a line underlying said element and parallel therewith.

6. Vehicle washing apparatus as set forth in claim 1, wherein is provided a series of second liquid nozzle units recessed in the surface below said element and discharging upwardly toward the latter, pipe means coupling said second nozzle units to said source of rinse liquid, and means for controlling flow of rinse liquid to said second nozzle units only during the time rinse water is permitted to flow to the first-mentioned nozzle units.

References Cited in the file of this patent
UNITED STATES PATENTS

| | | |
|---|---|---|
| 1,914,739 | Gorke | June 20, 1933 |
| 1,934,494 | Gillespie | Nov. 7, 1933 |
| 2,032,174 | Johnson | Feb. 25, 1936 |
| 2,514,304 | Bacon | July 4, 1950 |
| 2,699,792 | Fisher | Jan. 18, 1955 |
| 2,703,579 | Merancy | Mar. 8, 1955 |
| 2,732,846 | Berezny | Jan. 31, 1956 |
| 2,740,414 | Moskow | Apr. 3, 1956 |
| 2,754,834 | Merancy | July 17, 1956 |
| 2,756,759 | Swain | July 31, 1956 |
| 2,862,222 | Cockrell | Dec. 2, 1958 |